(12) United States Patent
Fevre et al.

(10) Patent No.: US 9,144,348 B2
(45) Date of Patent: Sep. 29, 2015

(54) FOOD PROCESSOR

(71) Applicant: HAMEUR S.A., Luxembourg (LU)

(72) Inventors: Loïc Xavier Fevre, Sanvignes les Mines (FR); Nicolas Lapray, Montceau en Bourgogne Cedex (FR)

(73) Assignee: HAMEUR S.A., Luxembourg (LU)

( * ) Notice: Subject to any disclaimer, the term of this patent is extended or adjusted under 35 U.S.C. 154(b) by 357 days.

(21) Appl. No.: 13/629,569

(22) Filed: Sep. 27, 2012

(65) Prior Publication Data
US 2013/0074706 A1 Mar. 28, 2013

(30) Foreign Application Priority Data

Sep. 28, 2011 (FR) ...................................... 11 58696

(51) Int. Cl.
*A23G 1/10* (2006.01)
*A47J 43/07* (2006.01)
*A47J 27/00* (2006.01)

(52) U.S. Cl.
CPC ............ *A47J 43/0766* (2013.01); *A47J 27/004* (2013.01)

(58) Field of Classification Search
CPC . A47J 43/0766; A47J 43/0716; A47J 43/075; A47J 43/085
USPC ............ 219/485, 494, 507–509; 99/348, 510, 99/585; 241/100, 166; 426/523; 366/146
See application file for complete search history.

(56) References Cited

U.S. PATENT DOCUMENTS

| 4,907,502 | A | * | 3/1990 | Snyder, Jr. | ...................... 99/455 |
| 6,712,497 | B2 | * | 3/2004 | Jersey et al. | .................. 366/274 |
| 2002/0012288 | A1 | | 1/2002 | Masip et al. | |
| 2006/0263501 | A1 | * | 11/2006 | Oghafua et al. | .............. 426/523 |
| 2009/0084274 | A1 | | 4/2009 | Kovacic et al. | |
| 2009/0171171 | A1 | * | 7/2009 | Matlock et al. | ............... 600/310 |
| 2013/0074700 | A1 | * | 3/2013 | Cheung | ........................... 99/348 |
| 2013/0315028 | A1 | * | 11/2013 | Smith | ........................... 366/146 |

FOREIGN PATENT DOCUMENTS

| FR | 2641458 A1 | 7/1990 |
| FR | 2890551 A1 | 3/2007 |
| WO | WO-03/001952 A2 | 1/2003 |
| WO | WO-2007/017461 A1 | 2/2007 |
| WO | WO-2009/103903 A1 | 8/2009 |
| WO | WO-2009-103904 A2 | 8/2009 |

* cited by examiner

*Primary Examiner* — Mark Paschall
(74) *Attorney, Agent, or Firm* — IM IP Law PLLC; C. Andrew Im

(57) ABSTRACT

The invention refers to a mechanical food treatment processor comprising a driving block topped by a bowl unit. The driving block comprises a motor connected to a rotation driving device configured to move a food treatment tool. The bowl unit comprises a functional element electrically supplied via an electric circuit connecting the bowl unit and the driving block. The electric circuit comprises at least two contacts between the bowl unit and the driving block. At least one of the contacts is achieved by the contact of two electrical contact surfaces, respectively located on an external surface of the bowl unit and on an external surface of the driving block. Each of the two electrical contact surfaces is substantially leveled with the external surface of the bowl unit or of the driving block. Such a configuration facilitates the cleaning of the external surfaces of the processor.

14 Claims, 3 Drawing Sheets

FOOD PROCESSOR

RELATED APPLICATIONS

This application claims priority from French Patent Application No. 11 58696 filed Sep. 28, 2011, which is incorporated herein by reference in its entirety.

TECHNICAL FILED OF THE INVENTION

The present invention refers to a mechanical food processor. More precisely, the present invention refers to a food processor such as a blender or a "cutter".

BACKGROUND OF THE INVENTION

Such a processor is known from the prior art. It typically comprises a driving block topped by a bowl unit. The driving block comprises a driving shaft able to rotate about a vertical or nearly vertical axis. A cutting tool, generally comprising cutting blades, is placed on the driving shaft. The cutting blades can thus ensure the cutting or the mixing of the food placed in the bowl unit, such as fruits or vegetables.

Such a food processor is described for example in document FR2641458.

In addition, it is known to provide the bowl unit with an electric device such as a heater, so as to combine a thermal action with a mechanical action on food.

The bowl unit is in general removable with respect to the driving block. Thus, after the operations of cutting or mixing, said bowl can be raised in order to transfer its contents into another container.

In addition, the electric device supported by the bowl unit is in general power supplied via the driving block. It is thus necessary to provide removable electric connections between the driving block and the bowl unit, as described for example in documents WO2009/103903, WO2009/103904, WO2007/017461 and WO03/001952.

Such electric connections, such as pins and connectors, generally comprises projections complicating the surface cleaning of the bowl unit and of the driving block. However, in particular in a professional environment, it is advantageous to be able to clean quickly and effectively the various elements of a food processor.

In addition, the need for avoiding short-circuits makes these electric connections more complex, which must be in some cases waterproof.

OBJECT AND SUMMARY OF THE INVENTION

The present invention enables to solve these problems and to implement a food processor whose bowl unit comprises an electric functional element, while allowing an easy cleaning of the electrical contact surfaces of the bowl unit and the driving block.

More precisely, the invention refers to a mechanical food processor, said processor comprising a driving block topped by a bowl unit, said bowl unit comprising a container able to receive food; the driving block comprises a power supply means; it moreover comprises a motor connected to a rotation driving means, said driving means being able to make a food treatment tool in the container move when the bowl unit is in a so-called working position on the driving block; the bowl unit comprises a functional element electrically supplied by an electric circuit connecting the bowl unit and the driving block to one another, said electric circuit comprising at least two contacts between said bowl unit and said driving block; at least one, preferably each one, of said contacts is achieved by the contact of two electrical contact surfaces, respectively located on an external surface of the bowl unit and on an external surface of the driving block; the processor is characterized in that each of said two electrical contact surfaces is substantially leveled with the external surface of the bowl unit or of the driving block.

In addition to the container able to receive food, the bowl unit according to the invention can comprise one or more following elements: a lid, possibly provided with a food introduction conduit; a food treatment tool, such as a whisk or a knife; one or more secondary containers mounted in the container; a possibly mobile or removable handle; a base or skirt of the container, possibly removable. This list is not restrictive, the bowl unit being able to comprising other elements known in the state of the art.

By "substantially leveled surface", one understands that there is a difference in level, which is very small or nil, between the electrical contact surfaces and the corresponding external surface of the bowl unit or of the driving block. Thus, if for example an operator passes a sponge on such an external surface, a possible projection of the contact surface will be too small to form a stop, or a possible cavity in said contact surface will not be very deep to accumulate food remains therein.

Preferentially, the electrical contact surface forms a small projection with respect to the external surface of the bowl unit or the driving block, rather than a cavity.

Such electrical contacts on the surface are manually accessible to a user. They thus require to be protected, in particular the electrical contact surfaces supported by the driving block and connected to the power supply.

One possibility is to supply the electric circuit with a very low voltage, in particular a very low safety voltage (VLSV) or a very low protection voltage (VLPV). The thresholds of these voltages vary according to standards and are in general lower than 50 volts in AC current and 120 volts in D.C. current. A very low voltage circuit is in particular able to supply a functional element such as a temperature sensor in the bowl unit.

When a higher supply voltage is needed, another possibility is to provide the processor with a mechanical safety device. Said device can in particular take: an active state so that an electrical contact surface supported by the driving block is connected to a power supply of said driving block; and a deactivated state so that the electrical contact surface is insulated from the power supply.

Preferably, the safety device is configured so as to be able to be in an active state only if the bowl unit is in the working position on the driving block, the passage from the active state to a deactivated state being carried out by a mechanical action of elements of said safety device.

Such a mechanical safety device comprises for example elements such as switches, examples of which will be described below.

For example, an operation of removing the bowl unit from its working position can be envisaged for causing the passage of the safety device into the deactivated state.

The expression "working position of the bowl unit" concerns all the elements of said bowl unit. More precisely, the displacement of only one of these elements can be considered as a removal from the working position.

For example, the passage of the safety device into the deactivated state can be caused by a rotation of the container with respect to the driving block, or by a rotation or an opening of a lid with respect to the container, or by a displacement of a mobile handle with respect to said container.

According to an alternative, the bowl unit is configured so as to be able to be removed from its working position only if the mechanical safety device is in the deactivated state.

According to a preferential embodiment of the invention, the mechanical safety device comprises a switch firmly fixed to the driving block, said switch being swung into the closed position when the bowl unit is moved into the working position on the driving block, by means of a magnet on the bowl unit. Said closed position corresponds to the active state of the safety device.

More preferentially, the switch is insulated from an external surface of the driving block by a tight protection comprising a flexible membrane.

According to a preferential embodiment of the invention, an electric functional element supported by the bowl unit is a food heating device. More preferentially, said functional element is located in a tight compartment in the bowl unit.

It is understood in all the present text that the terms such as "comprises one/two element(s)" are not restrictive and do not exclude, for example, the presence of additional elements.

According to a preferential embodiment of the invention, the bowl unit and the driving block are configured so that an operation of dismounting/mounting said bowl unit from/onto said driving block causes a friction between the electrical contact surfaces respectively supported by said bowl unit and said driving block. This friction enables to remove possible dirt from these contact surfaces when dismounting/mounting said elements, which improves the electrical contact.

BRIEF DESCRIPTION OF THE DRAWINGS

The invention will be better understood when reading the following description and examining the annexed figures. These figures are given as an indication and by no means as a restriction of the invention. The Figures show.

DETAILED DESCRIPTION OF THE EMBODIMENTS

Figure 1:
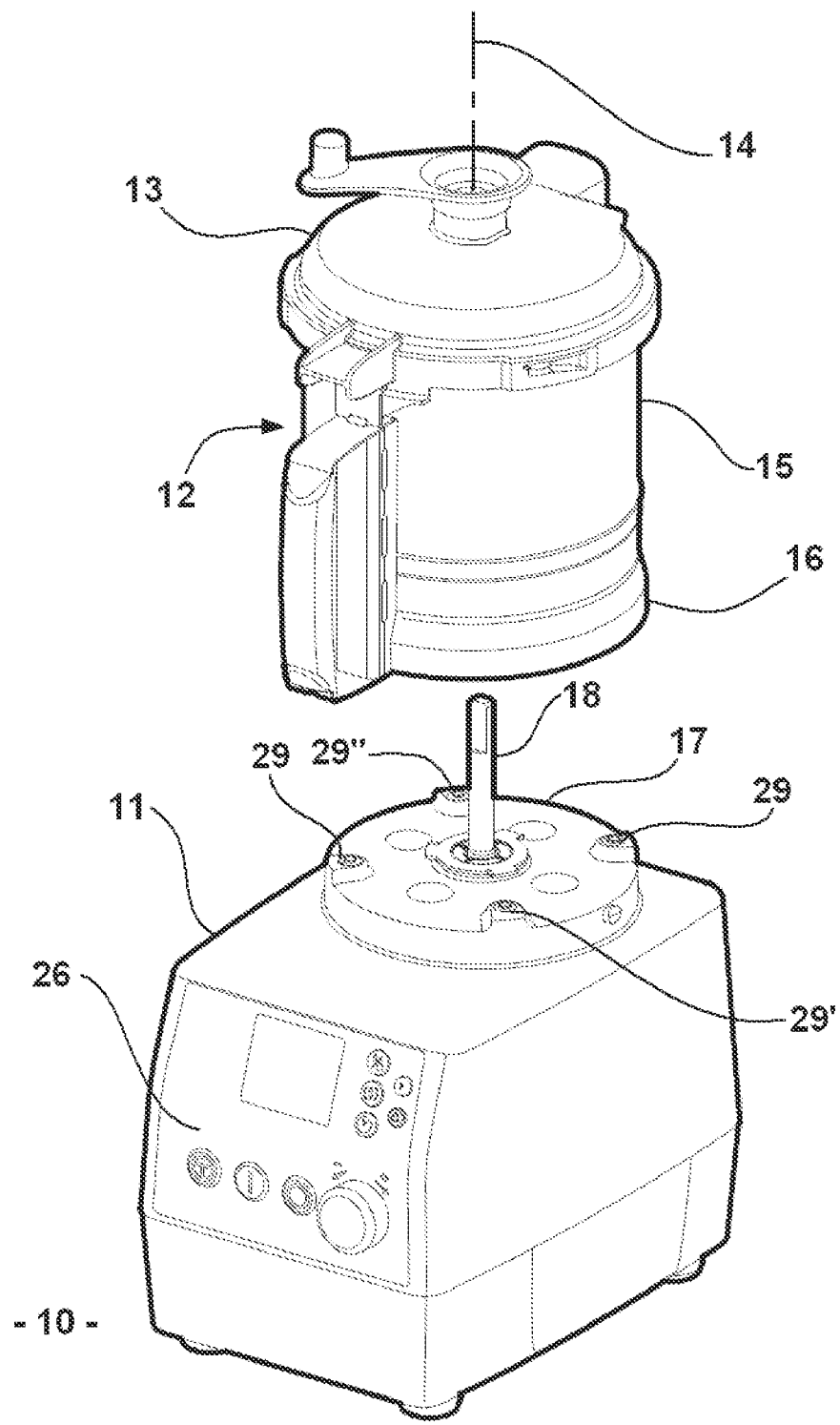
FIG. 1: a perspective view of a food processor according to an embodiment of the invention.

FIG. 1 shows a perspective semi-exploded view of a food processor according to an embodiment of the invention. The processor 10 comprises a driving block 11 topped by a bowl unit 12.

The bowl unit 12 comprises a container 15 able to receive food. The container 15 has a substantially cylindrical shape of revolution and is disposed along a substantially vertical axis 14. The container 15 itself is topped by a lid 13.

The bowl unit 12 moreover comprises a base 16, firmly fixed to a lower part of the container 15. The base 16 has a substantially annular shape so as to be able to fit a support 17 located in the upper part of the driving block 11. The support 17 substantially has the shape of a disc.

Figure 2:
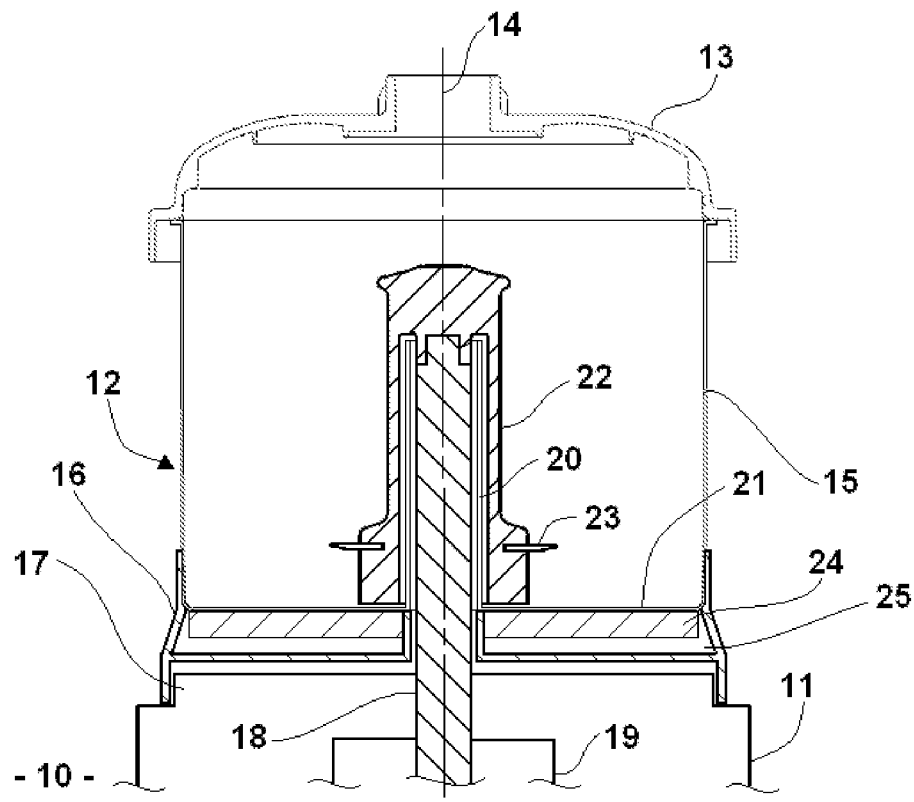
FIG. 2: a partial schematic vertical section of the processor in FIG. 1.

FIG. 2 represents a partial schematic view of the processor 10 according to a vertical cutting plane passing through the axis 14. The driving block 11 comprises a motor 19 connected to a rotation driving means 18 for a food treatment tool. Said means is a driving shaft 18 having a substantially cylindrical shape and disposed along the axis 14. The shaft 18 forms a projection in the center of the support 17.

When the bowl unit 12 is mounted on the driving block 11, the shaft 18 is received inside the container 15 through a conduit 20 in a bottom 21 of said container.

A food treatment tool 22 is located in the container 15 and fits on the conduit 20 and the driving shaft 18. The tool 22 is provided for example with at least one blade 23. The action of the tool 22, rotationally driven by the shaft 18, enables in particular to reduce in pieces or in fine particles of the food introduced into the container 15.

In addition, the bowl unit 12 is provided with an electric functional element 24. In the example represented in FIG. 2, the element 24 is a food heating device. The element 24 is for example fixed under the bottom 21 of the container 15. Preferentially, the element 24 is received in a tight compartment 25 in the bowl unit 12, under the container 15 inside the base 16. The element 24 is for example a heating resistance, which enables to heat or to cook the food introduced into the bowl unit 12.

According to an alternative embodiment, the processor 10 can be provided with an induction heating device. For example, the support 17 can contain an induction coil and the bottom 21 of the container 15 can be made out of a ferromagnetic material adapted to release heat to the food under the action of a magnetic field.

The power supply of the motor 19 and that of the heating element 24 can be controlled by a user, via an interface 26 (FIG. 1) located on the driving block.

The element 24 is electrically supplied via an electric circuit connecting the bowl unit 12 and the driving block 11. This circuit 27 can be seen in FIG. 3, which represents a partial schematic view of the processor 10 according to a vertical cutting plane passing through the axis 14. The electric circuit 27 is connected to a power supply means 34 for the driving block 11. The means 34 enables to connect the processor 10 to an electrical supply network.

The electric circuit 27 comprises at least two contacts between the bowl unit 12 and the driving block 11. These contacts are made of two studs 28 supported by the bowl unit 12, each of said studs 28 corresponding to with a stud 29 supported by the support 17. The studs 29 can also be seen in FIG. 1.

The studs 28 of the bowl unit 12 are located on a lower external surface 30 of the compartment 25 containing the heating element 24. Each of said studs 28 is electrically connected to the element 24.

Each stud 29 is located on an upper external surface 31 of the support 17. When the bowl unit 12 is mounted on the driving block 11 for making the processor 10 work, each stud 28 comes into contact with the corresponding stud 29.

Each stud (28, 29) forms an electrical contact surface which is substantially leveled with the corresponding external surface (30, 31) of the bowl unit or the driving block. Preferably, each stud (28, 29) forms a small projection with respect to the corresponding surface (30, 31). The projection is selected to be sufficiently small so that it is possible to clean the surfaces (30, 31) of the bowl unit and the driving block, for example by rubbing them with a wet sponge, without abutting against the studs (28, 29).

When the bowl unit 12 is dismounted from the driving block 11, as in FIG. 1, a user can come into contact with the studs 29 supported by the support 17. In order to avoid an electrocution, the processor 10 is provided with a mechanical safety device 32.

The device 32 comprises for example a switch 33 located on the circuit 27, between a stud 29 of the driving block and the power supply 34.

Possibly, the circuit 27 comprises another safety device 41, for example an electrostatic separation system such as a relay.

The device 41 can also be an electromechanical switch, controlled by an electronic control system (not represented) of the processor 10. A program of this electronic control system can deactivate the circuit 27 when the supply of the functional element 24 is not needed.

According to an alternative embodiment, the system 41 detects the presence of the lid 13 on the container 15, for example via a magnet. The system 41 can deactivate the circuit 27 as long as the lid 13 is not in the working position.

Preferably, the bowl unit 12 and the driving block 11 are assembled by using a bayonet system. In other words, they can be assembled by covering the support 17 with the base 16, then by rotating the bowl unit about the axis 14. Preferably, the bowl unit 12 and the driving block 11 are configured so that said rotation causes a friction between the studs 28 and the corresponding studs 29. This friction allows to remove a possible dirt or a possible surface oxidation from these studs, which improves the electrical contact.

Figure 4:
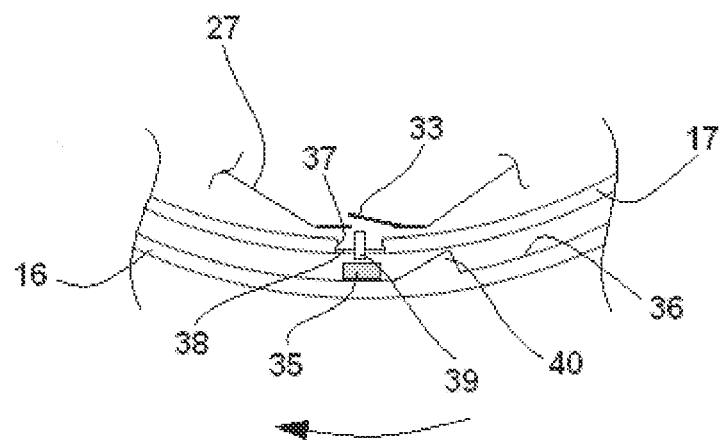
FIG. 4: a partial schematic horizontal section of the processor in FIG. 1.

FIG. 4 shows a partial schematic horizontal section of the base 16 and the support 17. FIG. 4 represents some elements of the mechanic safety device 32.

An annular internal wall 36 of the base 16 supports a magnet 35. In FIG. 4, the base 16 and the support 17 are represented in the working position of the processor 10. The magnet 35 is located opposite a switch 33 inside the support 17. Between the magnet 35 and the switch 33, there is an opening 37 in a wall of the support 17. This opening is closed by a flexible membrane 38, made for example out of plastic or rubber. A metal piece 39, preferably made out of a ferromagnetic material, is placed inside this membrane. Advantageously, a water tightness is ensured at the junction between the membrane 38 and the support 17, as well as between the membrane 38 and the metal piece 39.

When the magnet 35 is located opposite the switch 33 and the membrane 38, the magnet exerts an attraction on the metal piece 39 and a ferromagnetic piece of the switch. This attraction causes the closing of said switch, so that the heating element 24 can be electrically supplied.

After using the processor 10, the bowl unit 12 can be dismounted from the driving block 11. The dismounting operation comprises a first step of rotating the base 16 with respect to the support 17, in the direction of the arrow that can be seen in FIG. 4. Then, the magnet 35 moves away from the metal piece 39 and the switch 33. Moreover, a pin or a cam 40, located on the internal wall 36 of the base, pushes the metal piece 39 towards the switch 33. The mechanical action of the metal piece 39 causes the opening of the switch, which disconnects at least one stud 29 from its power supply.

Advantageously, each stud 29 is provided with a switch 33 and elements such as described above to make the switch swing between an open position and a closed position.

According to an alternative embodiment, it is possible to configure the mechanical safety device 32 so that, when the bowl unit 12 is in the working position on the driving block 11, an opening of the lid 13 causes the opening of the switch 33. Such a device would be similar to a safety system, as described in document FR2890551, which is incorporated herein by reference in its entirety, for the power supply of the rotary motor.

The device 32 can also have the possibility of closing the switch 33 only if the bowl unit 12 is in the working position, this position in particular comprising a closed lid 13.

Figure 3:
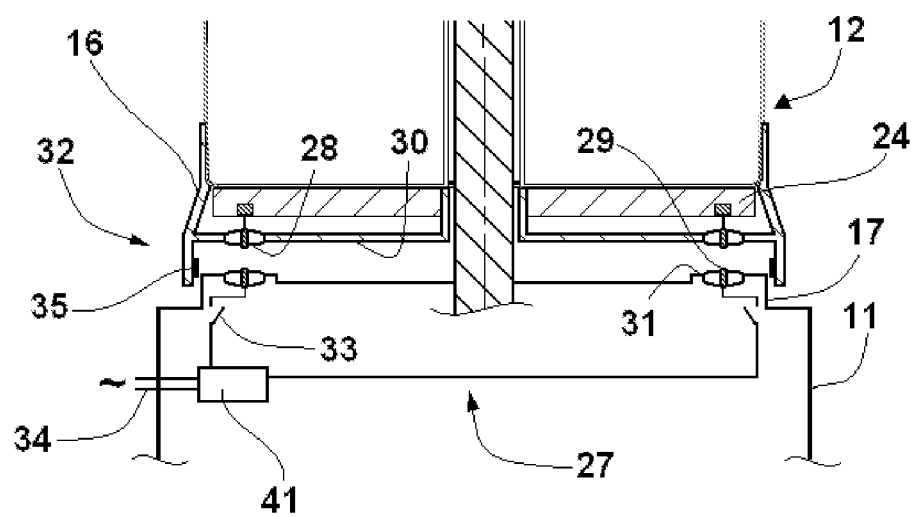
FIG. 3: a partial schematic vertical section of the processor in FIG. 1.
Figure 5:
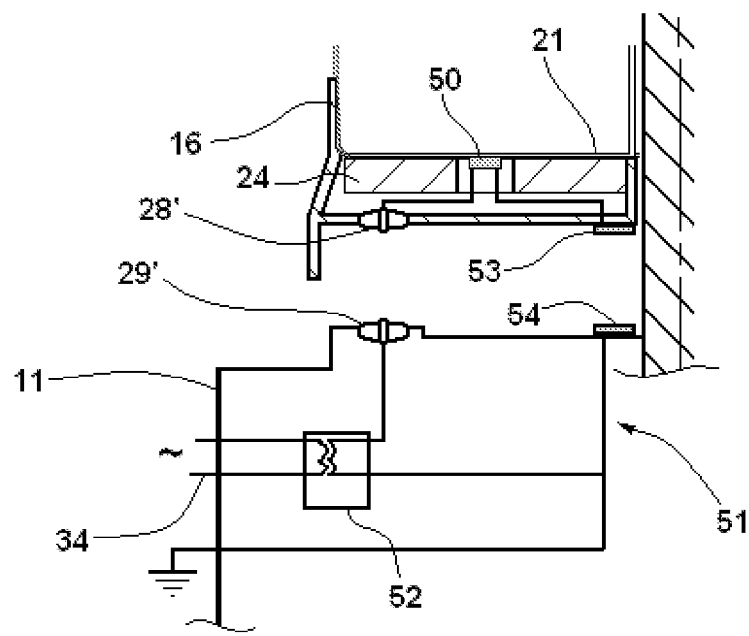
FIG. 5: a partial schematic vertical section of a food processor according to an embodiment of the invention.

FIG. 5 shows a partial schematic section of an embodiment of the invention which can correspond to the processor in FIG. 3.

In this embodiment, in addition to the heating element 24, the bowl unit 12 comprises another electric functional element 50. It can be for example a temperature sensor, located under the bottom 21 of the container 15.

Temperature information provided by the sensor 50 can be transmitted to the user via a temperature control monitor the interface 26 is provided with.

The sensor 50 is for example a CTN thermistor whose resistance varies according to temperature.

The sensor 50 is supplied with electric power by a very low voltage circuit 51. This very low voltage is preferentially lower than 50 volts in AC current. The circuit 51 is connected to power supply means 34 via a transformer 52.

The sensor 50 is electrically connected to a stud 28' whose shape is similar to that of the studs 28 of the previously-described circuit 27.

As described previously, when the stud 28' comes in contact with a corresponding stud 29', supported by the driving block 11, an electrical contact is generated. The stud 29' has a shape similar to that of the previously-described stud 29.

The sensor 50 is also electrically connected to an element 53 of the bowl unit 12, able to ensure an electrical contact with a corresponding element 54 of the driving block 11 when the base 16 is mounted on the base 17. The element 54 itself is connected to the power supply 34 by the transformer 52.

In addition, the elements (53, 54) ensure a equipotential protection or a grounding of the bowl unit 12. This grounding is particularly necessary when the processor 10 comprises a functional element 24 connected to a circuit 27 supplied with a voltage higher than the very low voltages. Indeed, the bowl unit preferentially comprises metal elements, such as the container 15 and the base 16.

According to an alternative embodiment, the bowl unit 12 can comprise only one or more temperature sensors and no heater. A grounding is nevertheless a safety process, even when all the electric circuits of the functional elements of the bowl unit are supplied with a very low voltage.

The elements (53, 54) form electrical contact surfaces which preferably are substantially leveled with the external surface 30 of the bowl unit or the external surface 31 of the driving block, for the same reasons of cleanability as previously exposed.

In the embodiment represented in FIG. 1, the processor 10 comprises a heater and two temperature sensors. The support 17 thus supports two studs 29 belonging to the previously-described circuit 27, as well as two studs (29', 29") belonging each to a very low voltage circuit.

The invention claimed is:
1. Mechanical food treatment processor comprising:
a driving block topped by a bowl unit, and comprising a power supply and a motor connected to a rotation driving device;
wherein the bowl unit comprises a container to receive food;
wherein the rotation driving device is configured to move a food treatment tool in the container in response to the bowl unit in a working position on the driving block;
wherein the bowl unit comprises at least one functional element electrically supplied by an electric circuit to electrically connect the bowl unit and the driving block to one another, the electric circuit comprising at least two electrical contacts between the bowl unit and the driving block;

wherein at least one electrical contact is achieved by the contact of two electrical contact surfaces, respectively located on an external surface of the bowl unit and on an external surface of the driving block; and wherein each of the two electrical contact surfaces is substantially leveled with the external surface of the bowl unit or of the driving block.

2. The processor of claim 1, further comprising a mechanical safety device configured to operate in an active state to connect an electrical contact surface supported by the driving block to power supply of the driving block and to operate in a deactivated state to insulate the electrical contact surface from the power supply means.

3. The processor of claim 2, wherein the mechanical safety device is in the active state only if the bowl unit is in the working position on the driving block; and wherein the mechanical safety device moves from the active state into the deactivated state by a mechanical action of elements of the mechanical safety device.

4. The processor of claim 3, wherein a removal of the bowl unit from the working position moves the mechanical safety device into the deactivated state.

5. The processor of claim 3, wherein the bowl unit can be removed from the working position only if the mechanical safety device is in the deactivated state.

6. The processor of claim 3, wherein the mechanical safety device comprises a switch fixed to the driving block, the switch moves into a closed position when the bowl unit is placed in the working position on the driving block by a magnet of the bowl unit, the closed position of the switch corresponds to the active state of the mechanical safety device.

7. The processor of claim 3, wherein a removal of the bowl unit from the working position triggers an action of a cam fixed to the bowl unit to move the mechanical safety device into the deactivated state.

8. The processor of claim 6, wherein the switch is insulated from an external surface of the driving block by a flexible membrane.

9. The processor of claim 2, further comprising a second safety device to interrupt the power supply of an electrical contact surface of the driving block.

10. The processor of claim 1, wherein a functional electric element supported by the bowl unit is a food heating device.

11. The processor of claim 1, wherein an electric circuit of a functional element of the bowl unit is supplied with a voltage lower than 50 volts in AC current or lower than 120 volts in D.C. current.

12. The processor of claim 11, wherein one of the electrical contacts of the electric circuit is a grounding contact of the bowl unit.

13. The processor of claim 11, wherein the electric circuit of the functional element is a temperature sensor.

14. The processor of claim 1, wherein the bowl unit and the driving block are configured so that dismounting/mounting of the bowl unit from/onto the driving block causes a friction between the electrical contact surfaces respectively supported by the bowl unit and the driving block.

* * * * *